United States Patent Office 3,085,419
Patented Apr. 16, 1963

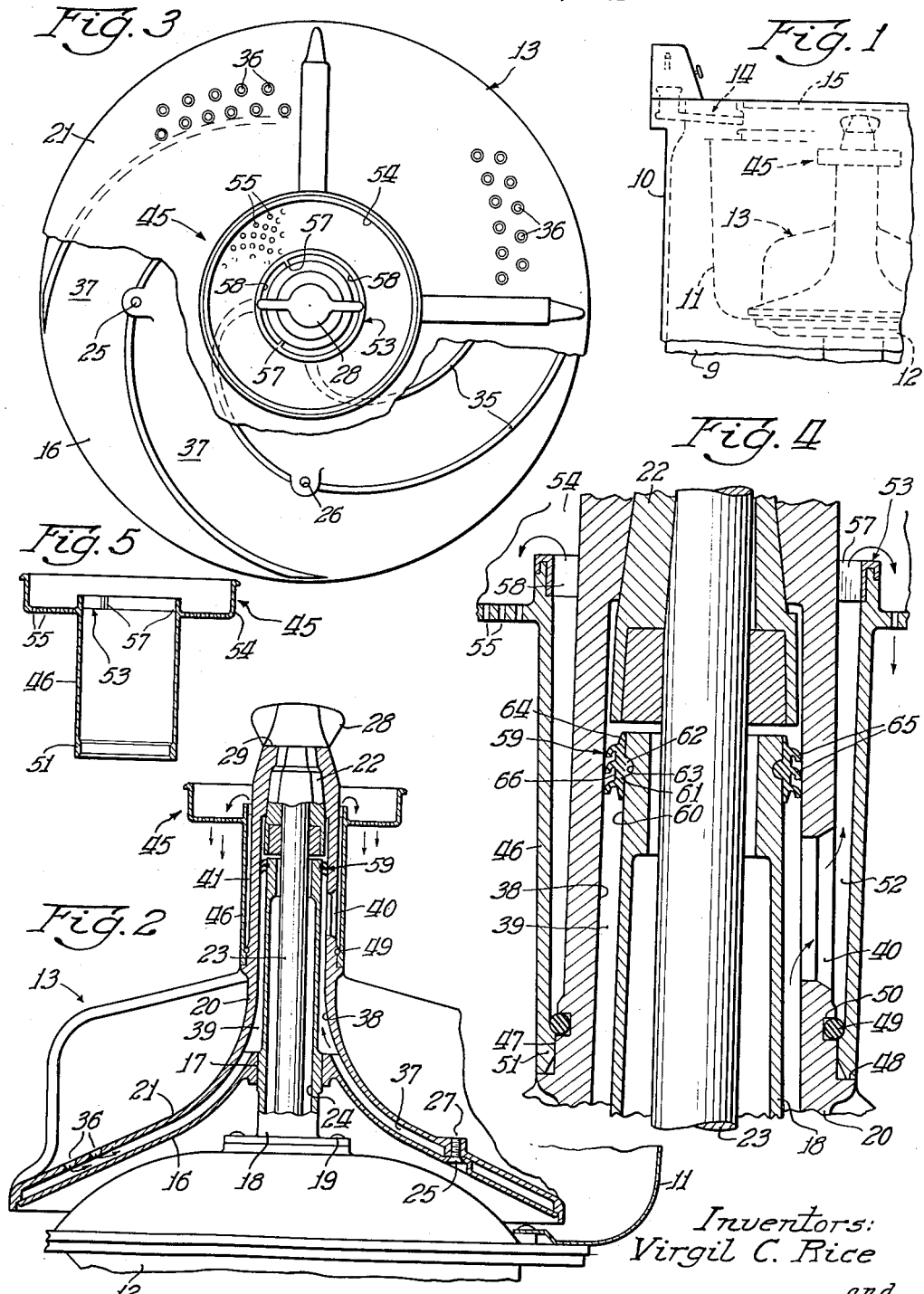

3,085,419
LINT FILTER AGITATOR SCREEN
Willis E. Harlow, Herrin, Ill., and Virgil C. Rice, South Bend, Ind., assignors to Borg-Warner Corporation, Chicago, Ill., a corporation of Illinois
Filed Oct. 23, 1961, Ser. No. 146,701
16 Claims. (Cl. 68—18)

This application relates to a filter and more particularly, to a removable lint filter for filtering the wash water of an automatic laundry washing machine.

In the operation of a washing machine, it is highly desirable to continuously filter the wash water during the washing cycle to remove undesirable particles from the water. An appropriate way of doing this is to pump water from the wash basket up through the clothes agitator of the washing machine and to cause the wash water to overflow into a filter which filters the water and allows the water to flow back into the laundry basket. The filter will become laden with lint and other foreign particles from the water. This will necessitate cleaning of the filter which may be most easily and efficiently done when the filter is detached from the machine.

When a filter is made to be detachably mounted on the agitator so as to facilitate cleaning of the filter, the filter may be positioned differently on the agitator each time it is reattached. If the filter is not concentrically attached to the agitator, it will wobble when the agitator is rotated. As a result, the filter will be inefficient and will present an unsightly appearance. It is, therefore, extremely desirable to provide a structure for filtering the wash water which may be easily removed to be cleaned and which may be readily attached to the agitator in concentric relation thereto to provide an efficient and attractive filter.

It is an object of this invention to provide a filter having a relatively simple and economical construction for filtering the wash water of an automatic laundry washing machine.

Another object of this invention is to provide a filter which can be readily attached and detached from the clothes agitator of a laundry washing machine.

A further object of this invention is to provide a filter for filtering the wash water of a laundry washing machine which is easily mounted and supported in a concentric manner on the washing machine agitator and which is efficient and attractive when rotated with the agitator.

With these and other objects in view, the present invention contemplates a filtering unit for a top-loading laundry machine which contemplates an agitator adapted to pump water upwardly between a center post and the agitator, and to discharge the water through the side of the agitator; a filter having a tubular body portion in sealing engagement with the agitator below the discharge thereof, surrounding the agitator, and spaced from the agitator to form a passage to receive fluid discharged from the agitator, and a filter screen extending outwardly from the filter body; and a supporting means for positioning the upper extremity of the filtering body portion on the agitator and having apertures therein to allow the fluid to flow from the space between the agitator and the filter body portion onto the filter screen to filter the fluid.

Other objects, advantages, and novel aspects of the invention will become apparent upon the following detailed description in conjunction with the accompanying drawings wherein:

FIG. 1 is a partial side view of a typical laundry machine showing the relative position of the basket, agitator, and filter;

FIG. 2 is a partial sectional view of the washing and filtering mechanism of the laundry machine and illustrating the lint filter mounted on the agitator;

FIG. 3 is a top view of the laundry machine mechanism shown in FIG. 2,

FIG. 4 is a partial sectional view of the mechanism sown in FIG. 3;

FIG. 5 is a sectional view of the lint filter showing the configuration thereof.

Referring to FIG. 1, as an example of an environment in which my invention is applicable, there is illustrated a washing machine of the type disclosed in Gerhardt Patent No. 2,807,951, issued October 1, 1957, which broadly includes a tub 9 in a casing 10, and a vertically disposed imperforate wash basket 11 within the tub and having a transmission casing 12 forming the bottom of the wash basket 11. An agitator generally designated by the numeral 13, is disposed within the wash basket 11 and is adapted to oscillate relative to the basket. Water is supplied to the basket 11 by a water supply means 14 and a hinged door 15 provides access to the basket 11.

The agitator 13 includes a conically-shaped base plate 16 rotatably mounted on a surface 17 of a cylindrical center post 18 which is rigidly secured to the transmission casing 12 by screws 19. The agitator 13 also includes a cylindrical body portion 20 which terminates, at the bottom thereof, in a conical base portion 21. The agitator body portion 20 is splined to a hub 22 which in turn is rigidly secured to a shaft 23. The shaft 23 is positioned in the bore 24 of the center post and is driven by a transmission (not shown) contained within the transmission casing 12.

The base portion 21 of the agitator 13 is secured to the base plate 16 by a series of screws 25 inserted through openings 26 (FIG. 3) in the base plate 16 and threadably attached to the base portion 21 at 27 (FIG. 2) of the agitator 13. The base plate 16 and the agitator 13 thereby form the agitator 13 which is rotatably supported on the surface 17 and by the driven hub 22. The agitator is held in position on the hub 22 and on the center post 18 by a wing nut 28 which is threadably attached to the shaft 23 and adapted to engage an upper surface 29 of the agitator 13 when tightened on the shaft 23.

The base plate 16 is provided with a series of spiral vanes 35 (FIG. 3) between the base plate 16 and the agitator base portion 21. The base portion 21 is provided with perforations 36 which allow the wash water to enter spaces 37 which are formed by the pumping vanes 35. It should be noted that the agitator body portion 20 is provided with an inner bore 38 which is larger than the center post 18 so that a cylindrical passage 39 is provided between the center post 18 and the agitator body portion 20. The passage 39 opens into the spaces 37 between the base plate 16 and the base portion 21 of the agitator 13. Also, the agitator body portion 20 is provided with a series of radially disposed openings 40 which interconnect the passage 39 and the outer surface 41 of the agitator body portion 20.

A lint filter unit, generally designated by the numeral 45, is provided for filtering the wash water and includes a cylindrical body 46 which is adapted to engage a cylindrical surface 47 and a shoulder 48 on the exterior of the agitator body portion 20. A sealing ring 49 is positioned in an annular groove 50 in the surface 47 of the agitator body portion 20 between the filter screen unit and the agitator body portion 20 and is adapted to seal the exterior of the agitator body portion 20 and the filter unit 45 against fluid flow downward therebetween. The sealing ring 49 is further adapted to engage an inwardly extending annular projection 51, formed on the lower end of the lint filter body 46. The sealing ring 49 and projection 51 thereby tend to hold the filter unit 45 against upward longitudinal movement and rotational movement relative to the agitator body portion 20. It should be particularly noted that the cylindrical surface 47 has a diameter large enough to position the lint filter body 46 in spaced relation to the agitator 13 so as to form a cylindrical passage 52 around the agitator 13.

An annular spacer 53 is provided between the upper portion of the agitator 13 and the upper end of the lint filter unit 45. A series of inwardly extending projections 57 are provided on the inner surface of the spacer 53 to position the upper end of the lint filter body 46 on the agitator 13 so as to maintain the cylindrical lint filter body 46 concentric to and in radially spaced relation to the agitator body portion 20 at the top of the agitator. The spacer 53 is thereby, also provided with passages 58 between the projections 57 to allow wash water to pass from the passage 52 through the spacer 53 and overflow (FIGS. 2 and 4) into a lint screen cup 54 connected to the lint filter body 46. The lint screen cup 54 is provided with perforations 55 to allow only the water to pass therethrough and to thereby filter out lint and other undesirable particles in the water.

A seal is generally designated by the numeral 59 (FIGS. 2 and 4). The seal 59 possesses particular utility in that it is specifically designed to seal a passage between two relatively rotating substantially concentric shafts. More particularly, in the laundry machine environment heretofore described, the seal 59 provides a seal for the cylindrical passage 39. The seal 59 is secured to an upper end of an outer surface 60 of the center post 18 and is disposed between the outer surface 60 and the inner surface 38 of the agitator body portion 20. The seal 59 is made of rubber or other resilient material and includes an annular body portion 61 provided with an inwardly extending annular projection or rib 62 which is adapted to seat in an annular groove 63 (FIG. 4) in the center post 18 to hold the seal 59 against movement longitudinally of the post.

The body portion 61 of the seal 59 is also provided with longitudinally extending annular end portions 64 which also normally extend slightly radially inward to create a fluid-tight contact between the seal body 61 and the outer surface 60 of the center post 18. The body portion 61 is further provided with radially extending flanges 65 which are spaced apart a predetermined distance 66 to allow deformation of the flanges 65, as illustrated in FIG. 4, without engagement of the flanges with each other. It should be noted that the flanges 65 normally extend radially beyond the inner surface 38 of the agitator body portion 20 so that when the agitator body portion 20 is positioned over the center post 18, as illustrated in FIGS. 2 and 4, the flanges 65 will be deformed as indicated in FIGS. 2 and 4 to yieldingly engage the agitator body portion 20 to effectively provide a seal preventing passage of fluid through the channel 39, defined by the agitator body portion 20 and center post 18.

*Operation*

During the washing cycle, the shaft 23, connected to the transmission gearing, drives the hub 22 and agitator 13 in oscillatory motion. The wash water normally passes through the agitator perforations 36 and enters the spaces 37 between the base plate 16 and the base portion 21 of the agitator 13. As the agitator 13 is oscillated, the vanes 35 will cause the water to be forced upwardly between the base plate 16 and the agitator base portion 21 as indicated by the arrows (FIG. 2). The lint-laden water thus forced upwardly will pass through the cylindrical passage 39, through the series of openings 40 in the agitator body 20, into the cylindrical passage 52 and overflow into the lint screen cup 54 as indicated by the arrows (FIGS. 2 and 4).

The lint is filtered from the water by the lint screen cup 54 as the water flows through the perforations 55 into the wash basket. As the water passes from the passage 39 through the series of radial openings 40, there will be a tendency for the water to continue to flow upwardly beyond the upper end of the center post 18, and, if not prevented, the wash water would flow downwardly along the shaft 23 into the transmission casing 12 with resultant damage to the transmission. The seal 59 prevents such damaging flow of wash water into the transmission casing 12 by preventing flow of wash water beyond the seal 59, through the opening between the center post 18 and the shaft 23, and into the bore 24 adjacent the transmission casing 12.

It should be noted that the lint filter unit 24 provides a passage or chamber 52 between the agitator body portion 20 and the cylindrical body 46 of the filter unit 45 to channel the water upwardly through passages 58 of the spacer 53 to the lint screen cup 54. Also, it should be noted that the projection 51 in engagement with the surface 47 and the shoulder 48, along with the spacer 53 on the upper end of the unit provide a concentric mounting for the unit which, in addition to facilitating high efficiency, provides an attractive filter which may be easily attached and detached for cleaning purposes.

What is claimed is:

1. A washing machine lint filter comprising in combination, an agitator oscillatable about a generally vertical axis and having means adapted to pump wash water upwardly within the agitator and through a discharge passage in the side of the agitator; a lint filter having a tubular body positioned on the agitator and having engagement with the exterior of the agitator below the discharge passage, said tubular body and agitator being in spaced relation to provide a conduit chamber between the exterior of the agitator and the tubular body and having an upper opening, said chamber receiving wash water from the agitator discharge passage and directing wash water out of the upper opening, a screen on said tubular body and extending outwardly of the upper extremity of the agitator for receiving wash water from the upper opening of the chamber, and means between tubular body and said agitator for positioning the upper extrmeity of said filter on the agitator.

2. A washing machine lint filter comprising in combination, an agitator oscillatable about a generally vertical axis and having means which pumps wash water upwardly within the body of the agitator and discharges the water through a discharge passage in the side of the agitator, said agitator having a peripheral shoulder formed thereon below the discharge passage; a lint filter having a tubular body supported on said shoulder and providing a conduit chamber between the exterior of the agitator and the tubular body and having an upper opening, said chamber receiving wash water from the discharge passage and directing wash water out of the upper opening, a screen extending outwardly of the upper extremity of the tubular body for receiving wash water from the upper opening of the chamber, and means secured to said tubular body and said agitator for positioning the upper extremity of said filter on the agitator.

3. A washing machine lint filter comprising in combination, an agitator oscillatable about a vertical axis and having means which pumps wash water upwardly within the body of the agitator and discharges the water through a discharge passage in the side of the agitator, said agitator having a peripheral shoulder formed on the agitator below the discharge passage; a filter having a tubular body supported on said shoulder and providing a conduit chamber between the exterior of the agitator body and the tubular body and having an upper opening, said chamber receiving wash water from the discharge passage and directing wash water out of the upper opening, a screen extending outwardly of the upper extremity of the tubular body for receiving wash water from the upper opening of the chamber, and means between the upper extremity of said filter and said agitator body for concentrically positioning the upper extremity of said filter on the agitator and defining the upper opening of said chamber.

4. A washing machine lint filter comprising in combination, an agitator oscillatable about a vertical axis and having means which pumps wash water upwardly within the body of the agitator and discharges the water through a discharge passage in the side of the agitator body, said agitator body having a peripheral shoulder formed on the agitator body below the discharge passage, a lint filter body supported on said shoulder and providing a conduit chamber between the exterior of the agitator body and the lint filter body and having an upper opening, said chamber receiving wash water from the discharge passage and directing wash water out of the upper opening, a projection formed on said lint filter body extending inwardly therefrom adjacent the bottom thereof and adapted for engagement with the agitator body below the discharge passage to position the bottom of the lint filter body on the agitator, and a screen extending outwardly adjacent the upper extremity of said lint filter body for receiving wash water from the upper opening of the chamber.

5. A washing machine lint filter comprising in combination, an agitator oscillatable about a vertical axis and having means which pumps wash water upwardly within the body of the agitator and discharges the water through a discharge passage in the side of the agitator, said agitator body having a peripheral shoulder formed on the agitator body below the discharge passage, a lint filter body supported on said shoulder and providing a conduit chamber between the exterior of the agitator body and the lint filter body and having an upper opening, said chamber receiving wash water from the discharge passage and directing the wash water out of the upper opening, a projection formed on said lint filter body extending inwardly therefrom adjacent the bottom thereof and adapted for engagement with the agitator body below the discharge passage to position the bottom of the lint filter body on the agitator, resilient sealing means engaging the agitator body and the lint filter body and disposed between the discharge passage and the shoulder for engaging said projection to releasably restrain upward movement of said lint filter body, and a screen extending outwardly of the upper extremity of said lint filter body for receiving wash water from the upper opening of the chamber.

6. A washing machine lint filter comprising in combination, an agitator oscillatable about a vertical axis and having means which pumps wash water upwardly within the body of the agitator and discharges the water through a discharge passage in the side of the agitator, a tubular lint filter body positioned on the agitator in engagement with the exterior of the agitator body below the agitator discharge passage and providing a conduit chamber between the exterior of the agitator body and the lint filter body and having an upper opening, said chamber receiving wash water from the discharge passage and directing wash water out of the upper opening, an annular cup secured to said lint filter body and receiving wash water from the upper opening of said chamber, said cup having its bottom provided with perforations to filter the wash water, and means connecting said lint filter body and said agitator for positioning the upper extremity of said lint filter body on the agitator.

7. A washing machine lint filter comprising in combination, an oscillating agitator which pumps wash water upwardly within the body of the agitator and discharges the water through a discharge passage in the side of the agitator, a lint filter body concentrically positioned on the agitator in engagement with the exterior of the agitator below the agitator discharge passage and providing a conduit chamber between the exterior of the agitator body and the lint filter body, said chamber having an upper opening, said chamber receiving wash water from the discharge passage and directing the wash water out of the upper opening, a seal engaging said lint filter body and said agitator body and located below the discharge passage, an annular cup connected to said lint filter body and receiving the wash water from the upper opening, said cup having perforations formed therein to filter the wash water, and means between and connecting said lint filter body and said agitator for concentrically positioning the upper extremity of said lint filter body on the agitator.

8. A washing machine lint filter comprising in combination, an oscillating agitator which pumps wash water upwardly within the body of the agitator and discharges the water through a discharge passage in the side of the agitator, a lint filter body positioned on the agitator in engagement with the exterior of the agitator below the agitator discharge passage providing a conduit chamber between the exterior of the agitator body and the lint filter body and having an upper opening, said chamber receiving wash water from the discharge passage and directing the wash water out of the upper opening, a lint screen extending outwardly of the upper extremity of the lint filter body for receiving wash water from the upper opening of the chamber, and means secured to said lint screen body in engagement with the exterior of said agitator for positioning the upper extremity of said lint screen body on the agitator, said supporting means having passages formed therein for allowing wash water to pass upwardly therethrough onto said screen.

9. A washing machine lint filter comprising in combination, an oscillating agitator which pumps wash water upwardly within the body of the agitator and discharges the water through a discharge passage in the side of the agitator, a peripheral shoulder formed on the agitator below the discharge passage, a lint filter body positioned on said shoulder providing a conduit chamber between the exterior of the agitator body and the lint filter body and having an upper opening, said chamber receiving wash water from the discharge passage and directing the wash water out of the upper opening, and a lint filter cup disposed outwardly of the upper extremity of the body for receiving wash water from the upper opening chamber.

10. A washing machine lint filter comprising in combination, an oscillating agitator which pumps wash water upwardly within the body of the agitator and discharges the water through a discharge passage in the side of the agitator, a peripheral shoulder formed on the agitator below the discharge passage, a lint filter body supported on said shoulder providing a conduit chamber between the exterior of the agitator body and the lint filter body and having an upper opening, said chamber receiving wash water from the discharge passage and directing the wash water out of the upper opening, and a projection formed on said lint filter body extending inwardly therefrom adjacent the bottom thereof and adapted for engagement with the agitator below the discharge passage to position the bottom of the lint filter body on the agitator, and a screen extending outwardly adjacent the upper extremity of said lint filter body for receiving the wash water from the chamber.

11. A washing machine lint filter comprising in combination, an agitator oscillatable about a vertical axis and which pumps wash water upwardly within the body of the agitator and discharges the water through a discharge passage in the side of the agitator, a peripheral shoulder formed on the agitator below the discharge passage, a lint filter body supported on said shoulder providing a conduit chamber between the exterior of the agitator body and the lint filter body and having an upper opening, said chamber receiving wash water from the discharge passage and directing the wash water out of the upper opening, an annular projection formed on said lint filter body extending inwardly therefrom adjacent the bottom thereof and adapted for engagement with the agitator below the discharge passage to support the lint filter on the agitator, a lint filter cup having a perforate screen bottom, said cup being connected to the upper portion of said lint filter body, and means secured to said lint filter body in engagement with the exterior of said agitator for positioning the cup concentrically to the vertical axis of the agitator, said supporting means having passages formed therein for allowing wash water to pass upwardly therethrough into said cup.

12. A washing machine lint filter comprising, in combination, an agitator oscillatable about a generally vertical axis and having means adapted to pump wash water upwardly within the agitator and through a discharge passage in the side of the agitator, a lint filter having a tubular body supported on the agitator, said tubular body and agitator being in spaced relation to provide a conduit chamber receiving wash water from the agitator discharge passage, said chamber having an upper opening for flow of wash water from the chamber, and a screen on said tubular body and extending outwardly thereof for receiving wash water from the upper opening of the chamber.

13. A washing machine lint filter comprising, in combination, an agitator oscillatable about a generally vertical axis and having means adapted to pump wash water upwardly within the agitator and through a discharge passage in the side of the agitator, a lint filter having a tubular body positioned on the agitator and engaging the exterior of the agitator below the discharge passage thereof, said tubular body and agitator being in spaced relation to provide a conduit chamber receiving wash water from the agitator discharge passage, said chamber having an upper opening for flow of wash water from the chamber, and a screen on said tubular body and extending outwardly thereof for receiving wash water from the upper opening of the chamber.

14. A washing machine lint filter comprising, in combination, an agitator oscillatable about a generally vertical axis and having means adapted to pump wash water upwardly within the agitator and through a discharge passage in the side of the agitator, a lint filter having a tubular body supported on the exterior of the agitator below the discharge passage thereof, said tubular body and agitator being in spaced relation to provide a conduit chamber receiving wash water from the agitator discharge passage, said chamber having an upper opening for flow of wash water from the chamber, and a screen on said tubular body and extending outwardly thereof for receiving wash water from the upper opening of the chamber.

15. A washing machine lint filter comprising, in combination, an agitator oscillatable about a generally vertical axis and having means adapted to pump wash water upwardly within the agitator and through a discharge passage in the side of the agitator, a lint filter having a tubular body positioned on the agitator, a seal between the tubular body and the exterior of the agitator below the discharge passage thereof, said tubular body and agitator being in spaced relation to provide a conduit chamber receiving wash water from the agitator discharge passage, said chamber having an upper opening for flow of wash water from the chamber, and a screen on said tubular body and extending outwardly thereof for receiving wash water from the upper opening of the chamber.

16. A washing machine lint filter comprising, in combination, an oscillating agitator adapted to pump wash water upwardly within the agitator and provided with a discharge passage in the side of an agitator, a tubular lint filter body positioned on the agitator and in spaced relation to said agitator to provide a conduit chamber between the agitator and the lint filter body, means closing the lower end of said chamber beneath said discharge passage, said chamber having an upper opening, said chamber receiving wash water from the agitator discharge passage and having an upper opening for flow of the wash water from said chamber, and a lint filter cup connected to and extending outwardly of the upper extremity of the lint filter body for receiving wash water from the upper opening of said chamber and having a screen for filtering lint from the wash water.

References Cited in the file of this patent

UNITED STATES PATENTS

| 2,909,501 | Altorfer | Oct. 20, 1959 |
| 2,976,711 | Smith | Mar. 28, 1961 |
| 3,015,225 | McWethy | Jan. 2, 1962 |